United States Patent [19]

Steimle

[11] 4,221,407
[45] Sep. 9, 1980

[54] COUPLING ASSEMBLY FOR PLASTIC TUBING

[76] Inventor: Wayne D. Steimle, 8808 Las Tunas Dr., San Gabriel, Calif. 91766

[21] Appl. No.: 923,244

[22] Filed: Jul. 10, 1978

[51] Int. Cl.² .................. F16L 21/00; F16L 23/00; F16L 25/00
[52] U.S. Cl. .................. 285/236; 285/416; 285/423
[58] Field of Search ............. 285/236, 235, 369, 420, 285/367, 416, 423, 364–366

[56] References Cited

U.S. PATENT DOCUMENTS

| | | | |
|---|---|---|---|
| 2,261,948 | 11/1941 | Beach | 285/236 X |
| 3,233,922 | 2/1966 | Evans | 285/369 X |
| 3,380,763 | 4/1968 | Schmunk | 285/235 X |
| 3,529,854 | 9/1970 | Thomas | 285/369 X |
| 3,836,182 | 9/1974 | Miller | 285/369 X |
| 3,857,588 | 12/1974 | Curtin | 285/235 X |
| 4,013,309 | 3/1977 | Quick | 285/423 X |
| 4,067,534 | 1/1978 | Frey | 285/369 X |
| 4,119,334 | 10/1978 | Steed | 285/236 |

FOREIGN PATENT DOCUMENTS

| | | | |
|---|---|---|---|
| 6111 | 3/1869 | France | 285/364 |
| 6703410 | 9/1968 | Netherlands | 285/367 |
| 465724 | 5/1937 | United Kingdom | 285/367 |
| 585024 | 1/1947 | United Kingdom | 285/365 |
| 880847 | 10/1961 | United Kingdom | 285/235 |

Primary Examiner—Roy D. Frazier
Assistant Examiner—Carl F. Pietruszka
Attorney, Agent, or Firm—Sellers and Brace

[57] ABSTRACT

A separable coupling for plastic tubing comprising a pair of plastic collars sized to form a high strength bonded interference fit with the ends of plastic tubing. A pliant elastomeric sleeve encircles and bridges the two collars and includes ribs interneşting with grooves formed encircling the exterior of the collars. Clamping bands assembled about the sleeve bridging the two collars separably interlock the components together in a fluid-tight manner.

1 Claim, 3 Drawing Figures

COUPLING ASSEMBLY FOR PLASTIC TUBING

This invention relates to pipe couplings and more particularly to an improved and novel separable coupling for use with plastic tubing.

BACKGROUND OF THE INVENTION

The extensive use of plastic tubing has presented vexatious problems in the provision of a satisfactory union or separable coupling kit interconnecting aligned lengths of metal and plastic tubing, or two sections of plastic tubing. Quite effective solutions have been found under low pressure conditions, but these are quite unsuitable and quite unreliable for pressures in excess of 50 to 60 psi.

Typical examples of prior coupling proposals are disclosed in the following patents: Harkenrider U.S. Pat. No. 2,776,151; Houghton U.S. Pat. No. 2,998,269; Jewell U.S. Pat. No. 3,061,339; Richardson U.S. Pat. No. 3,264,013; Marcus et al U.S. Pat. No. 3,284,110; Gajewski et al U.S. Pat. No. 3,456,965; Garrett U.S. Pat. No. 3,565,468; Hollingsworth U.S. Pat. No. 3,801,141; Horsley U.S. Pat. No. 3,813,116; Taylor U.S. Pat. No. 3,837,683; Read U.S. Pat. No. 3,572,773; Lowe U.S. Pat. No. 4,026,584; and Carter U.S. Pat. No. 3,784,239. These disclosures represent a wide variety of concepts dealing specifically with junctions between tubing including at least one plastic tube. However, none of these proposals provide a satisfactory solution to the problem of separably joining two plastic tubes interconnecting closely spaced appliances and subject to higher fluid pressures, such as those in the range of 50 psi to 125 psi, or more. There are many operating environments subject to these pressure conditions as well as those including semi-permanently installed appliances inter-connected by plastic tubing with bonded joints. Service operations on such appliances frequently require severing the plastic tubing and this presents time consuming problems when re-joining the severed tubing. No satisfactory coupling meeting these and similar needs is presently available.

SUMMARY OF THE INVENTION

The numerous shortcomings and deficiencies of prior couplings for use with plastic tubing are resolved by this invention in a highly reliable and satisfactory manner. The coupling kit includes a pair of inwardly flanged plastic collars designed to have a telescopic interference fit with conventional plastic tubing to which the collars are quickly anchored in a fluid-tight joint by bonding solvent. The exterior of the collars is preferably grooved to provide an interlocking nesting fit with complementally shaped internal ribs of an elastomeric sleeve snugly bridging the two collars and assembled thereabout while the abutting collars are in axial alignment. Thereafter an encircling clamping device is tightened to clamp both ends of the sleeve firmly in place and inter-locked with the two collars. The coupling is quickly released by relaxing the clamps and then shifting these and the elastic sleeve axially of the tubing.

Accordingly, it is the primary object of this invention to provide an improved and novel coupling assembly for separably joining plastic tubing.

Another object of the invention is the provision of an inexpensive readily assembled and disassembled coupling for plastic tubing utilizing a pair of collars permanently bondable to the tubing parts to be coupled together and bridged by an elastomeric sleeve and clamping band means.

Another object of the invention is the provision of a separable coupling for plastic tubing utilizing three simple molded components and clamping band means for holding the molded components separably inter-locked in a fluid-tight manner.

Another object of the invention is the provision of a separable coupling kit for plastic tubing free of threaded components and utilizing two molded plastic components bondable to the tubing ends to be joined and bridged by a surrounding elastomeric gasket held thereto by encircling clamping bands.

These and other more specific objects will appear upon reading the following specification and claims and upon considering in connection therewith the attached drawing to which they relate.

Referring now to the drawing in which a preferred embodiment of the invention is illustrated:

Figure 1:
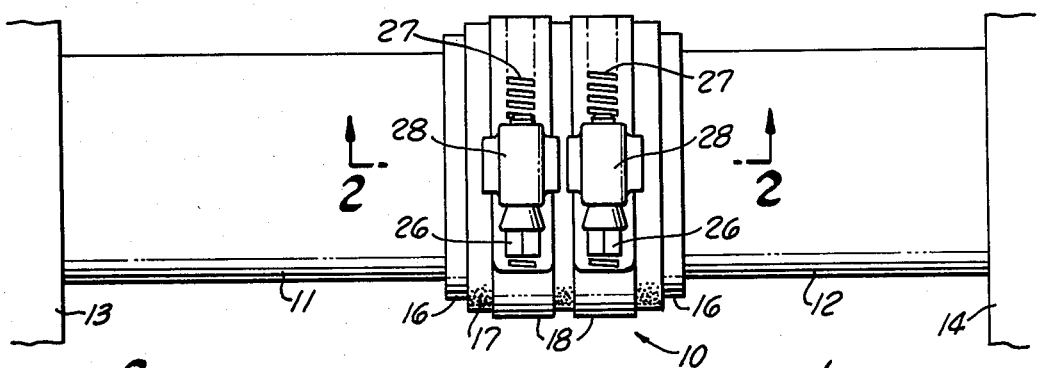
FIG. 1 is an elevational view of an illustrative embodiment of the invention assembled to a pair of short plastic tubes interconnecting a pair of closely spaced appliances.

Referring initially and more particularly to FIG. 1, there is shown a typical embodiment of the invention coupling kit, designated generally 10, assembled to a pair of plastic tubes 11, 12 permanently bonded to a pair of appliances 13 and 14. For example, appliance 13 might comprise a water filter and appliance 14 a circulating pump of a swimming pool installation. This is but one of many applications utilizing standard extruded plastic tubing and fittings in fluid systems subject to fluid pressures ranging between 50 and 125 lbs, or even more, and in which the plastic tubing joints are customarily permanently bonded by a solvent or the like.

Figure 2:
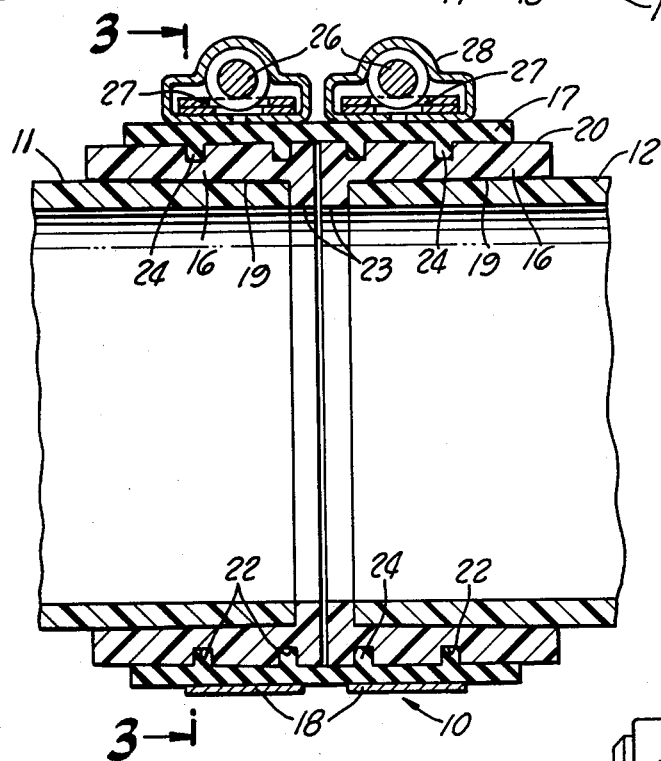
FIG. 2 is a cross-sectional view on an enlarged scale taken along line 2—2 on FIG. 1.
Figure 3:
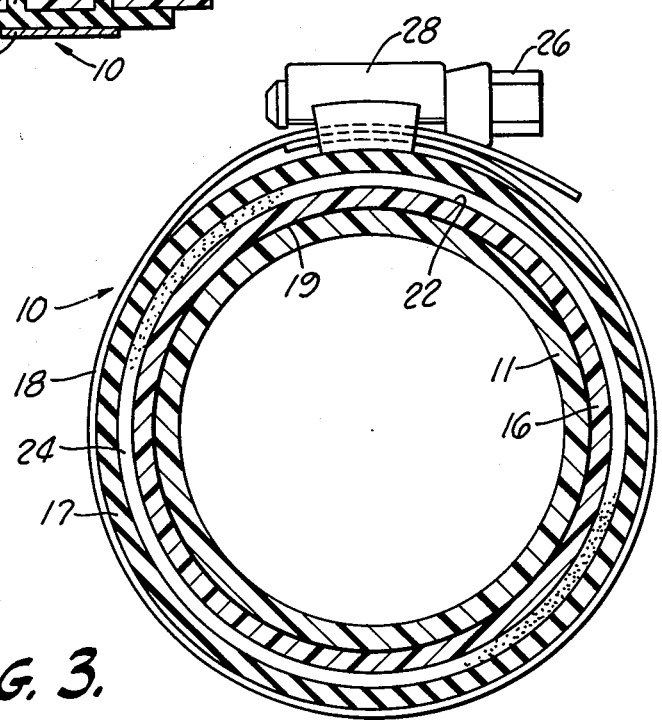
FIG. 3 is a cross-sectional view taken along line 3—3 of FIG. 2.

Referring to FIGS. 2 and 3, it is pointed out that coupling 10 comprises a pair of identical molded plastic collars 16, 16, a soft pliant elastomeric gasket sleeve 17, and at least one and preferably two clamping bands 18. Collar 16 has a socket 19 having a slightly tapering sidewall sized to have an interference telescopic fit over the end of a plastic tube for which is is designed. Preferably but not necessarily, the exterior surface 20 is also tapered so that the two surfaces converge toward 19 one end of the collar and includes at least one and preferably two or more annual grooves 22.

The large end of collar 16 is provided with an inwardly projecting collar which acts as a stop against which the ends of tube 11 or 12 seats during assembly of the collar to the tube. Thus it is desirable that socket 19 as well as the outer surface of the conduit end be coated with solvent for the particular plastic composition of the tubing and the collars and that the collars then be forcibly telescoped over the tubing until the tube end firmly abuts interior sidewall of flange 23. This assures a high strength permanently assembled operation and permits the adjacent end surfaces of the collar to be assembled in closely abutting relationship.

Gasket sleeve 17 is molded from suitable high strength pliant elastomeric material and includes inwardly projection annular ribs 24 complemental to and seating snugly within collar grooves 22. If the exterior surface of 20 of the collars is tapered, the interior surface of sleeve 17 is complementally tapered. This sleeve has an axial length adequate to bridge all or a major portion of the underlying collars 16 and is assembled thereover while the collars are axially aligned.

Clamping bands 18, 18, as herein shown, are of a well known type comprising a metal band having its ends overlapped and held adjustably together by a screw 26 having a helical thread of rectangular cross section. This thread is sufficiently deep to extent into rectangular slots 27 and extending crosswise of the mid portion of the band end at an angle. The adjustable screw 26 is held captive on one end of the band in well known manner by an encircling clip 28.

It will be evident that the invention coupling may be assembled to the mid-length of a short section of plastic tubing permanently assembled in an operating environment simply by cutting out a short length of the original tubing and cutting away sufficient material to permit the assembly of collars 16 over its opposite ends to the adjacent ends of the installed tubing and then reinstalling the short section using a pair of the couplings 10. This expedient involves the use of a pair of the invention couplings but avoids the need for disturbing the appliances interconnected by the short length of tubing.

While the coupling assembly for plastic tubing herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. That improvement in aligned adjacent sections of plastic tubing interconnecting installed appliances comprising a separable coupling assembly which improvement comprises:

a plastic collar for each of the adjacent ends of said plastic tubing sections having the inner and outer surfaces converging toward one end thereof, said outer surfaces having annular grooves with substantially radial sidewalls and said inner surfaces being sized to have an interference telescopic fit substantially throughout the length thereof with a respective one of said tubing sections and solvent bonded thereto with said collars in axial alignment and with larger ends thereof closely adjacent one another;

a flexible elastomeric gasket sleeve bridging and snugly embracing the outer oppositely tapering surfaces of said plastic collars and having inwardly projecting annular ribs having radial sidewalls complemental to and snugly seated in said grooves; and a pair of adjustable and contractable bands encircling said elastomeric sleeve in close proximity to one another and radially opposite a respective one of said plastic collars, said bands and said elastomeric sleeve being readily removable and reinstallable with respect to said plastic collars to permit servicing one appliance without disturbing the other.

* * * * *